Aug. 26, 1969  E. A. RIVARD  3,462,834
FORK FOR OPENING MUFFINS
Filed Oct. 27, 1967
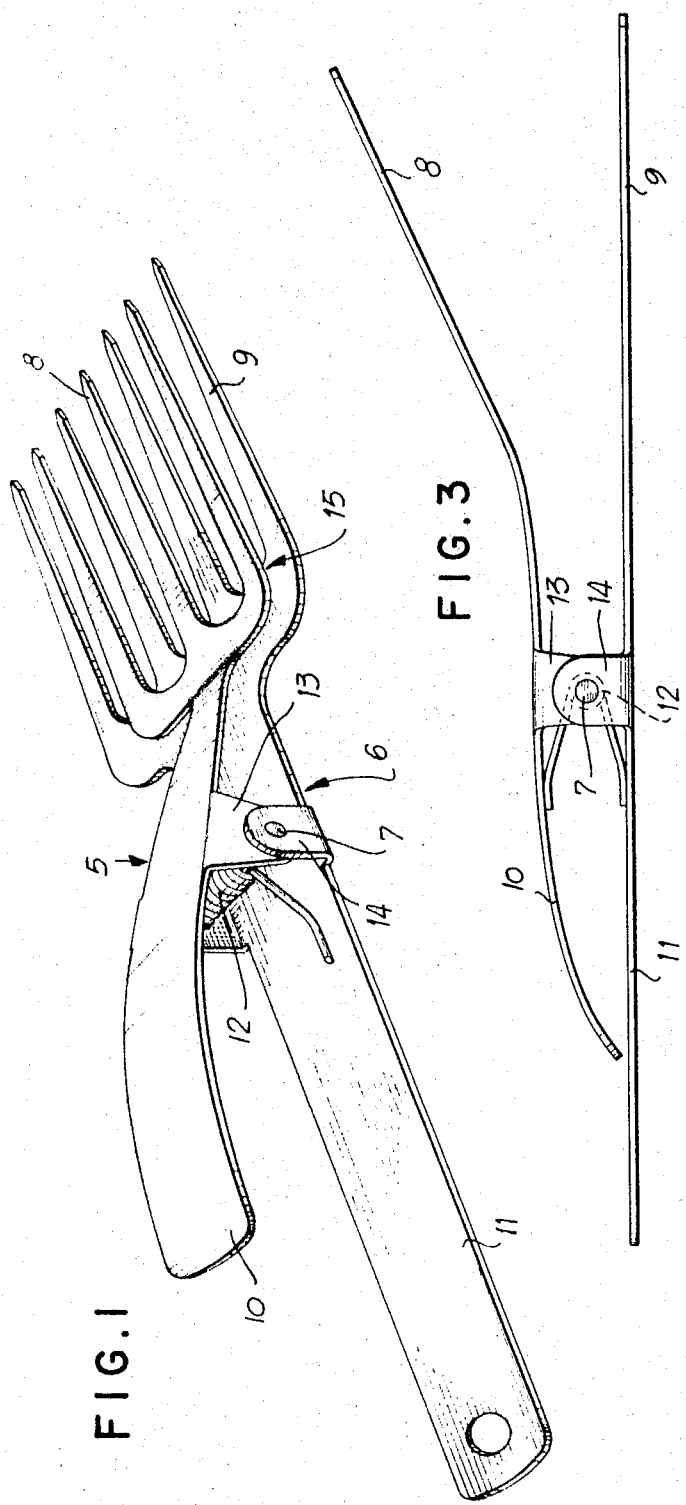
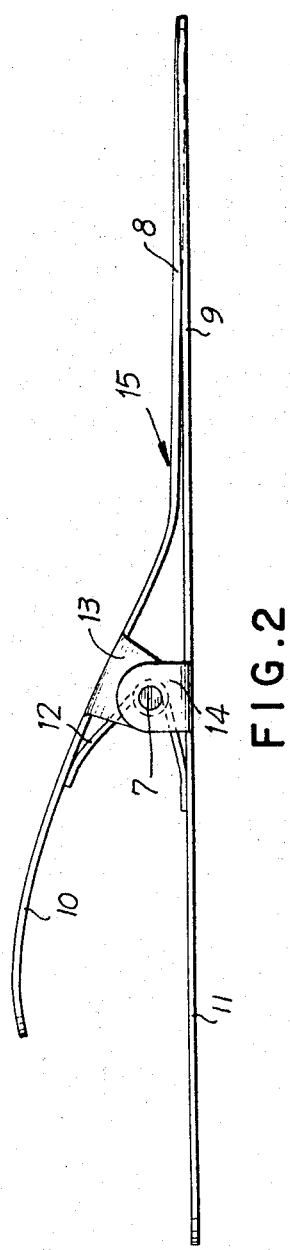
INVENTOR.
EMILE A. RIVARD
BY
ATTORNEY

United States Patent Office 3,462,834
Patented Aug. 26, 1969

3,462,834
FORK FOR OPENING MUFFINS
Emile A. Rivard, 70 Morningside Drive,
New York, N.Y. 10027
Filed Oct. 27, 1967, Ser. No. 678,712
Int. Cl. A47j 43/28
U.S. Cl. 30—137                          1 Claim

ABSTRACT OF THE DISCLOSURE

Companion forks in overlying relation pivoted together intermediate their ends, with intermeshing tines at one end, and gripping handles at the opposite end and a spring acting on the handles for holding the forks with the tines convergent to a common plane at the tips and the handles spaced for gripping engagement to effect a spreading separation of the tines.

---

The objects of this invention have been to provide a device for opening muffins and other bakery products with a fork-like penetration and splitting action, of simple inexpensive construction, which would be easy to use and which would be practical for the purposes intended.

These and other desirable objects have been accomplished by a novel construction and combination of parts, outlined above and illustrated in a practical embodiment in the drawing accompanying and forming part of this specification.

FIG. 1 in the drawing is a perspective view of one of the new muffin openers in the normal closed position ready for insertion into a muffin or other such article.

FIG. 2 is a side elevation of the device in closed position.

FIG. 3 is a similar view in the open position.

As shown in the several views, the device consists essentially of a pair of companion upper and lower forks 5 and 6, pivoted together intermediate their ends at pivot pin 7 and having alternately disposed intermeshing tines 8 and 9 at one end and projecting opposed gripping handles 10, 11 at the opposite end.

A spring 12, coiled about the pivot pin 7 and bearing at opposite ends against the upper and lower handle members, applies pressure to yieldingly hold the forks with the points of the tines registered in a single common plane and the handles spaced apart for gripping pressure to effect separation of the tines of the two forks.

Lugs 13 struck down from opposite edges of the upper fork and mating lugs 14 struck upward from opposite edges of the lower fork, provide necessary support for the pivot pin 7.

The forks are of simple outline and may be inexpensively produced by punching them out of sheet metal.

The lower fork is shown as flat and straight and the upper as curved and slanted down toward the lower, providing a wedge outline of the tines, converging to the pointed tips meeting on a single line to offer least entry resistance.

To maintain alignment of the opposing tines, the upper fork is arranged to engage the lower fork substantially along the line 15, with one fork thus acting as a stop limiting the relative closing or aligning movement of the forks.

The penetrating and spreading forks combined as illustrated may be held and operated in one hand, leaving the other hand free for properly holding a muffin or other such object.

While particularly designed for opening or splitting muffins, and the like, it will be appreciated that the invention may be put to other uses.

For example, by pinching the handles together, the forks will be opened or separated, enabling the device to be used as a spatula for picking up and holding hamburgers, pancakes and other edibles.

What is claimed is:

1. A forklike muffin penetrating and opening implement comprising
    companion forks in opposed facing relation,
    pivot means connecting said forks intermediate their ends,
    said forks having intermeshing tines at one end, at one side of the pivotal point and projecting handles at the opposite end, at the opposite side of the pivotal point,
    said forks engaging at the tine ends of the same to hold the tines of the respective forks in convergent wedge outline and with the tips of the tines aligned on a common axis and
    a spring on said pivot means engaged with said projecting handles for yieldingly holding such handles in separated gripping relation and said forks engaged to align the tines as aforesaid,
    said forks consisting of thin flat material having angularly projecting lugs at opposite edges of the same overlapping to form parts of said pivot means and the balance of said pivot means including a pivot pin extending through the overlapping portions of said lugs,
    the spring being a coiled wire spring wrapped about said pivot pin and having its opposite ends bearing against said projecting handles to thereby normally hold the forks engaged with the tips of said tines in alignment for easy penetration of a muffin or the like.

References Cited

UNITED STATES PATENTS

| | | | |
|---|---|---|---|
| 1,775,571 | 9/1930 | Romer | 30—150 |
| 2,024,849 | 12/1935 | Eliopoulos | 30—137 X |
| 2,892,655 | 6/1959 | Bower | 294—106 |

FOREIGN PATENTS 175,226    8/1906    Germany.

MYRON C. KRUSE, Primary Examiner

U.S. Cl. X.R.
294—106